No. 766,178. PATENTED AUG. 2, 1904.
F. W. GARDNER.
COOKY OR DOUGHNUT CUTTING DEVICE.
APPLICATION FILED JAN. 2, 1904.
NO MODEL.
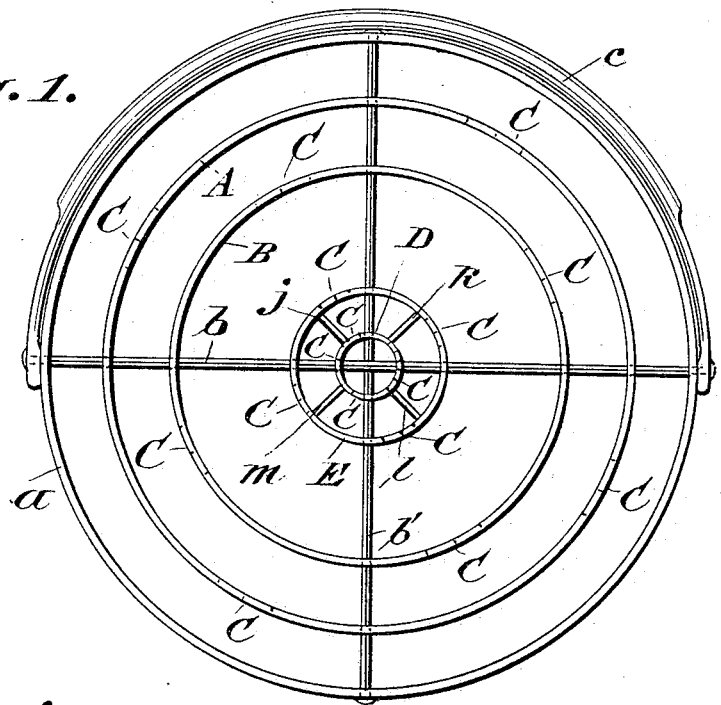
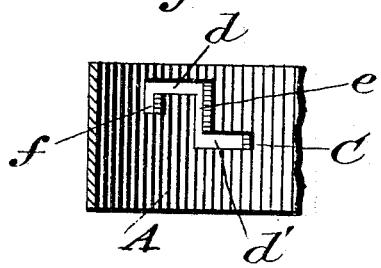
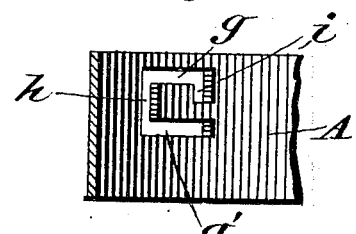
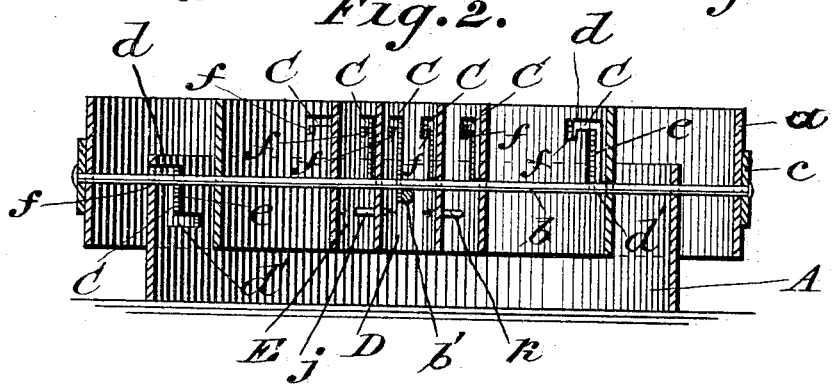
WITNESSES:
Lucius F. Mills.
Ruth D. Johnson
INVENTOR.
Frank W. Gardner,
BY Edward L. Mills,
ATTORNEY.

No. 766,178.                                                                                           Patented August 2, 1904.

UNITED STATES PATENT OFFICE.

FRANK W. GARDNER, OF IONIA, MICHIGAN.

COOKY OR DOUGHNUT CUTTING DEVICE.

SPECIFICATION forming part of Letters Patent No. 766,178, dated August 2, 1904.

Application filed January 2, 1904. Serial No. 187,450. (No model.)

*To all whom it may concern:*

Be it known that I, FRANK W. GARDNER, a citizen of the United States, residing at Ionia, in the county of Ionia and State of Michigan, have invented certain new and useful Improvements in Cooky or Doughnut Cutting Devices; and I do hereby declare the following to be a full, clear, and exact description of the invention, such as will enable others skilled in the art to which it appertains to make and use the same.

My invention relates to improvements in cooky and doughnut cutting devices; and the objects of the same are to provide one which is simple in its construction, being of compact form, the parts of which are easily and quickly adjusted to the proper position for their desired use, one which is so constructed that a purchaser is not compelled to purchase for the use he desires separate articles, and thereby add to the expense and time in caring for such articles, also one which may be easily and economically manufactured, and, furthermore, which consists in the construction and arrangement of its parts, which will be more fully hereinafter described and definitely pointed out in the claims. I accomplish these objects by means of the mechanism herein described and illustrated in the accompanying drawings, in which—

Figure 1 is a plan view of my improved cooky and doughnut cutting device. Fig. 2 is a perpendicular transverse sectional view of the same. Fig. 3 is a part-sectional view of one of the circular cutters shown in detail, and Fig. 4 a modification of the same.

Referring to the drawings, $a$ indicates a band to which is secured the rods or braces $b$ and $b'$ to keep it in circular form.

$c$ is a handle which is loosely mounted on the rod or brace $b$ at the outer ends thereof and is kept in engagement therewith by means of riveted heads on the ends of said rod or brace $b$. Adjustably mounted on and supported by the rods or braces $b$ and $b'$ are a series of cutters A and B, preferably circular in form, which cutters A and B have a series of peculiarly-shaped slots C C C C therein, through which the rods or braces $b$ and $b'$ extend. Referring to Fig. 3, one of the slots is shown more clearly in detail and is angular in form, having two horizontal elongated portions $d$ and $d'$, perpendicular elongated portion $e$, and shortened perpendicular portion $f$. Referring to Fig. 2, I have shown the cutter A as being in its proper position for use, the lower or cutting edge having been lowered below the lower edge of the band $a$. The shortened perpendicular portions $f f f f$ of the slots C C C C are for the purpose of preventing the rods or braces $b$ and $b'$ moving within said slots C C C C, said portions $f f f f$ forming a lock to hold the cutter A in a rigid position while said cutter is being used. Referring to Fig. 4, the slot, which is of a modified form, has its horizontal portions $g$ and $g'$ and perpendicular portions $h$ and $i$ parallel to each other.

D and E are cutters which are of similar construction as cutters A and B, and they are joined together by means of braces $j$, $k$, $l$, and $m$. Said cutters D and E have slots in them similar to those in cutters A and B and are mounted on the rods or braces $b$ and $b'$ in the same manner as hereinbefore described, being adapted for use in cutting doughnuts, and are of the smallest diameters, being arranged nearest the center of my improved device.

It will be understood that while all of the cutters are in a normal or inoperative position their bottom and top edges are on the same plane to each other, the rods or braces $b$ and $b'$ being extended through the horizontal portions of the slots C, and when it is desired to adjust a cutter to its proper position for use it is necessary to revolve the same a short distance to the right, allowing the perpendicular portions $e$ of the slots C to drop down, while the rods or braces $b$ and $b'$ strike the upper wall of the horizontal portions $d$, from which places the cutter is further revolved to the right through the horizontal portions $d$ of said slot and pressed into the shortened perpendicular portions $f$, where it is locked. When the modified form of slots in the cutters are used, as shown in Fig. 4, the adjustment is made in a similar manner, except that the cutters are turned to the left, while the horizontal portions $g$ of said slots in said cutters move on the rods or braces $b$ and $b'$.

Should it be desired to use the device for making crullers, the two cutters A and B are used, which will form rings for this purpose to be afterward twisted into the forms or shapes desired.

When it is desired to make cookies of different sizes, it will be understood that only one cutter is used at one time.

It is obvious that any number or forms of cutters may be used in my improved device without departing from the nature and principle of my invention.

Having thus described my invention, what I claim as new, and desire to secure by Letters Patent, is—

1. In a cooky and doughnut cutting device, the combination with the band $a$, rods $b$, and $b'$, and handle $c$, of one or more cutters having a series of angular slots therein through which the rods $b$, and $b'$, extend and on which the cutters are adjustably mounted, each of which angular slots has two horizontal portions $d$, and $d'$, perpendicular, elongated portions $e$, and shortened, perpendicular portions, $f$, substantially as described.

2. In a cooky and doughnut cutting device, the combination with the band $a$, rods $b$, and $b'$, and handle $c$, of two cutters D, and E, having slots C, therein and braces $j$, $k$, $l$, and $m$, secured to said cutters, substantially as described.

In testimony whereof I affix my signature in presence of two witnesses.

FRANK W. GARDNER.

Witnesses:
M. M. McGeary,
F. A. Stiven.